United States Patent [19]
Kanai et al.

[11] Patent Number: 5,735,098
[45] Date of Patent: Apr. 7, 1998

[54] FIRE-RESISTANT COMPOSITION, PANEL AND EXTERNAL WALL FOR VARIOUS BUILDINGS

[75] Inventors: Masami Kanai; Tadashi Sakai, both of Osakashi, Japan

[73] Assignee: Stylite Kogyo Co., Ltd., Osaka, Japan

[21] Appl. No.: 766,318

[22] Filed: Dec. 13, 1996

Related U.S. Application Data

[62] Division of Ser. No. 506,917, Jul. 26, 1995, Pat. No. 5,624,607.

[30] Foreign Application Priority Data

Aug. 2, 1994 [JP] Japan .................. 6-181549
Aug. 2, 1994 [JP] Japan .................. 6-181553

[51] Int. Cl.⁶ ........................................ E04B 1/38
[52] U.S. Cl. .................... 52/508; 52/506.01; 52/232; 52/309.9; 52/309.14
[58] Field of Search ................ 52/309.8, 309.9, 52/309.14, 506.01, 506.02, 508, 796.1, 232, 461, 506.07

[56] References Cited

U.S. PATENT DOCUMENTS

| | | | |
|---|---|---|---|
| 4,242,406 | 12/1980 | El Bouhnini et al. | 52/309.14 X |
| 4,301,198 | 11/1981 | Prior | 52/309.14 X |
| 4,343,669 | 8/1982 | Prior | 52/309.14 X |
| 4,364,987 | 12/1982 | Goodwin | 52/784.11 X |
| 4,443,988 | 4/1984 | Coutu, Sr. | 52/309.9 |
| 4,464,215 | 8/1984 | Cogliano | 52/309.8 X |
| 4,486,995 | 12/1984 | Allen et al. | 52/309.8 |
| 4,882,288 | 11/1989 | Moore | 52/309.9 |
| 5,220,760 | 6/1993 | Dimakis | 52/309.9 |
| 5,345,738 | 9/1994 | Dimakis | 52/309.9 |
| 5,522,195 | 6/1996 | Bargen | 52/309.9 X |

*Primary Examiner*—Carl D. Friedman
*Assistant Examiner*—Yvonne Horton-Richardson
*Attorney, Agent, or Firm*—Armstrong,Westerman,Hattori, McLeland & Naughton

[57] ABSTRACT

A fire resistant composition for forming a fire resisting lining is characteristically and substantially composed of ettringite contained as a main ingredient. A panel that is attachable to a building body so as to form an external wall thereof is composed of a base plate and the fire resisting lining that contains ettringite as its main ingredient and covers the base plate. A structure of an external wall of buildings, the structure has the panels attached to the building body to form a plane and having their sides adjoined one to another, and the base plate in each panel has a periphery not covered with the lining. A groove-shaped cavity appearing between the adjacent lining edges facing one another is filled with a caulking material, so that the fire resistance afforded by the composition and the panels is further enhanced.

9 Claims, 8 Drawing Sheets

FIRE-RESISTANT COMPOSITION, PANEL AND EXTERNAL WALL FOR VARIOUS BUILDINGS

This is a division of application Ser. No. 08/506,917 filed Jul. 26, 1995 now U.S. Pat. No. 5,624,607.

BACKGROUND OF THE INVENTION

1. Field of the Invention

The present invention relates to (1) a fire resistant composition, (2) a panel made thereof for forming external walls of various buildings, and (3) the structure of the external wall, wherein the composition is designed to line or coat various structural elements made of metals, resins and/or lumber to be incorporated in steel-framed buildings, or to line the sizing parts or pieces used in ceramics industries or cement factories, and wherein the panel includes those to form stud walls in wooden houses.

2. Prior Art

Fire resistance of constructive parts such as steel beams for steel-framed buildings is prescribed in detail in the Japanese Building Standards Act, Enforcement Ordinance thereof, Article 107. The standards are given in the term of 'fire resisting time' for each constructive element such as walls, floors and pillars. Test method of judging fire resistance is set forth in 'JIS A-1304' (Japanese Industrial Standards) recited in the Administrative Order No. 2999 issued in 1969 by the Ministry of Construction. JIS A-1304 is entitled: 'Method of Testing the Fire Resistance of Construction Parts', with the Order being entitled: 'Implementation of Fire-Resistant Structures'. The test method of JIS A-1304 consists of (i) the heating of unloaded specimens, (ii) the heating of loaded specimens and (iii) the applying of impact to them. The first item (i) above is further subdivided into: resistance to heat for duration of 30 min; ditto. for duration of 1 hour; ditto. for duration of 2 hours; and ditto. for duration of 3 hours. Specimens each coated with a fire-resistant lining should not be heated to an average temperature of 350° C. within the prescribed period of 30 min or else, when kept in an oven whose temperature is about 1000° C.

Many proposals have been made in an effort to meet the official requirements as to fire resistance, wherein some of them are classified in the wet type, with the others being the dry type. Japanese Patent Publication No. Hei.2-28555 discloses a fire-resistant composition, whose ingredients are a hydraulic cement, aluminum hydroxide and a certain carbonate. When heated, aluminum hydroxide will be dehydrated and the carbonate decomposed, both absorbing heat and respectively generating water vapor and carbon dioxide gas useful to extinguish the fire.

An enhanced fire resistance will reduce more or less the thickness of a fire resisting layer covering the construction elements or parts. In other words, the fire resisting layer must not only be improved in fire resistance but also be as thin as possible. Such a thin fire resisting layer will be beneficial in lowering the weight of construction parts and in expediting the construction works. It is however noted that the proposals such as recited above have not realized yet a satisfactory fire resistant composition.

Not only the steel-framed buildings but also wooden houses or buildings must be more resistant to fire.

External walls including stud walls in wooden houses are sometimes or usually such outer panels that are covered with a fire resistant lining composed of a polystyrol foam and a cement. Those linings are bonded to plywood plates to form the so-called 'lath-cut' panels, which are to be nailed or otherwise secured to supporting members. Mortar or plaster will be applied to the outer face of those lath-cut panels.

Similarly to the steel-framed buildings, the external walls of wooden houses must be approved as to their fire resistance, in accordance with Japanese Building Standards Act. They have to come up with the standard of 'secondary heating' as defined in the item 'Measurement of Fire Resistance of Non-Combustible Construction Parts' in JIS A-1302. In this test of second class heating, the temperature of one major side face of the external wall should not rise above 260° C. within a prescribed time, when placed in an atmosphere having a temperature of 1000° C.

As mentioned above, the conventional fire-resistant lining on the external wall panels is usually composed of polystyrol foam and cement. Fire resistance of this lining is however not high enough to render its thickness less than 12 mm. Therefore, the plywood base plate carrying the lining about 12 mm thick must be about 9 mm thick. Mortar about 8 mm thick must be applied to the lining surface when the buildings or houses are constructed. Due to such a thick and heavy external wall, construction works cannot be done smoothly within a shorter period and at a reasonable cost, further reducing an internal space adjacent to the wall. Highly and specially skilled workers must attend to the application of mortar, thus causing more serious the disadvantages noted above.

In cold districts, comfortable wooden houses comprise in general heat insulating walls.

The so-called internal heat insulators widely employed have each an athermalized core sandwiched between an outer board and an inner board, wherein the core is usually made of a rock wool or glass wool.

Dew condensation takes place on the inner face of outer board, at low outdoor temperatures. Such a condensate will erode the outer board made of plywood or the like and will stain the inner board made for example of a decorative plywood.

The so-called external heat insulators were therefore proposed recently, because no dew tends to condensate between the outer and inner boards.

An example of the external heat insulators comprises a heat insulating material such as the so-called 'styrofoam' (viz. a trade name of polystyrol foam) bonded to a plywood base plate. This insulator will be attached to an outer face of skeleton and then lined with mortar. Since the insulating material is disposed outside the outer board, there will arise no problem of dew condensation.

The external heat insulators of this type also are disadvantageous in that the mortar finish is not sufficiently resistant to fire. They will not be qualified as heat insulators as prescribed in JIS A-1302, unless a difficult plaster work is done by a highly skilled plasterer to form a considerably thick outer layer, similarly to the usual external walls. This will incur a longer time, a higher cost of and a larger space for the construction work.

It is also proposed to use a light concrete foam called 'Autoclaved Light-Weight Concrete' or 'ALC' as the external heat insulator.

The 'ALC' boards are however not sufficient in heat insulation, also an increased thickness thereof rendering them heavier and causing a longer period and a raised cost of construction works. Moreover, 'ALC' boards are so hygroscopic that they tend to absorb water which will freeze in the cold season and cold districts. Due to expansion of the ice thus formed in internal pores is likely to cause those boards to crush or burst.

OBJECTS OF THE INVENTION

An object of the present invention is therefore to provide a composition that is more resistant to fire than those known in the art, when used as the lining of construction elements. Another object is to provide a panel comprising the fire resistant composition and adapted to form external walls which meet the requirements of fire resistance, so that said walls can be constructed in a shorter time at a reduced cost and without needing any superfluous space, and so that said walls can be highly heat insulating for use in the cold districts. Still another object is to provide a novel and advanced structure of the external walls so that the desired characteristics and advantages thereof are ensured.

SUMMARY OF THE INVENTION

From a first aspect, a fire resistant lining composition characteristically comprises ettringite as a principal ingredient thereof. The composition may consists of: a mixture of 100 parts by weight of ettringite and 5–500 parts by weight of an inorganic particulate compound emitting at 100°–1000° C. a noncombustible gas; a mixture of 100 parts by weight of ettringite and 0.01–50 parts by weight of titanium oxide powder; or a mixture of 100 parts by weight of ettringite, 5–500 parts by weight of the inorganic particulate compound and 0.01–50 parts by weight of titanium oxide powder.

Figure 1:
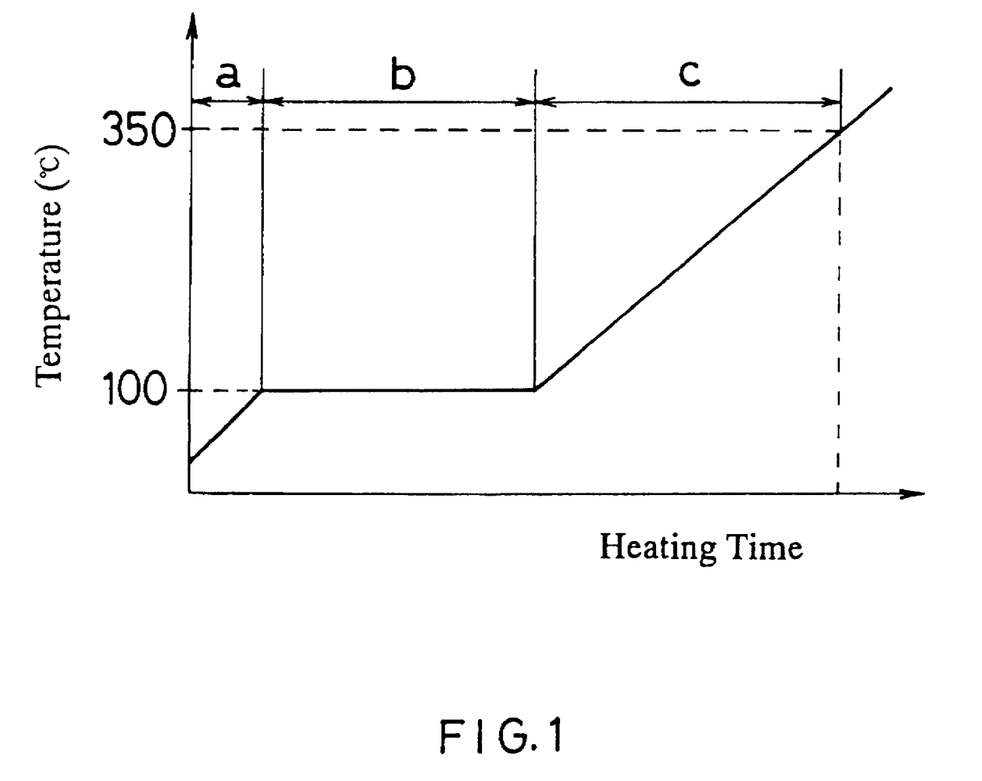
FIG. 1 is a graph showing the relationship found between the heating time and the temperature of fire resistant composition lining covering a face of base plate.

Referring to FIG. 1, there is a graph showing the relationship between the heating time and the temperature of a construction element lined with fire resistant material and heated in accordance with JIS A-1304: 'Method of Testing the Fire Resistance of Construction Parts'. In an initial period 'a', the temperature rises to 100° C. that is the boiling point of water. During an intermediate stable period 'b', the temperature remains at 100° C. due to evaporation of water contained in the construction element. In a final period, the temperature rises in a monotonous manner in the course of time beyond 350° C., so that the time necessary for the temperature to rise up to 350° C. is given as 'fire resisting time'. As seen in FIG. 1, longer periods 'a' and 'b' as well as a lower gradient in the period 'c' will elongate the time for the element to be heated to 350° C., indicating a stronger resistance to fire.

Figure 2:
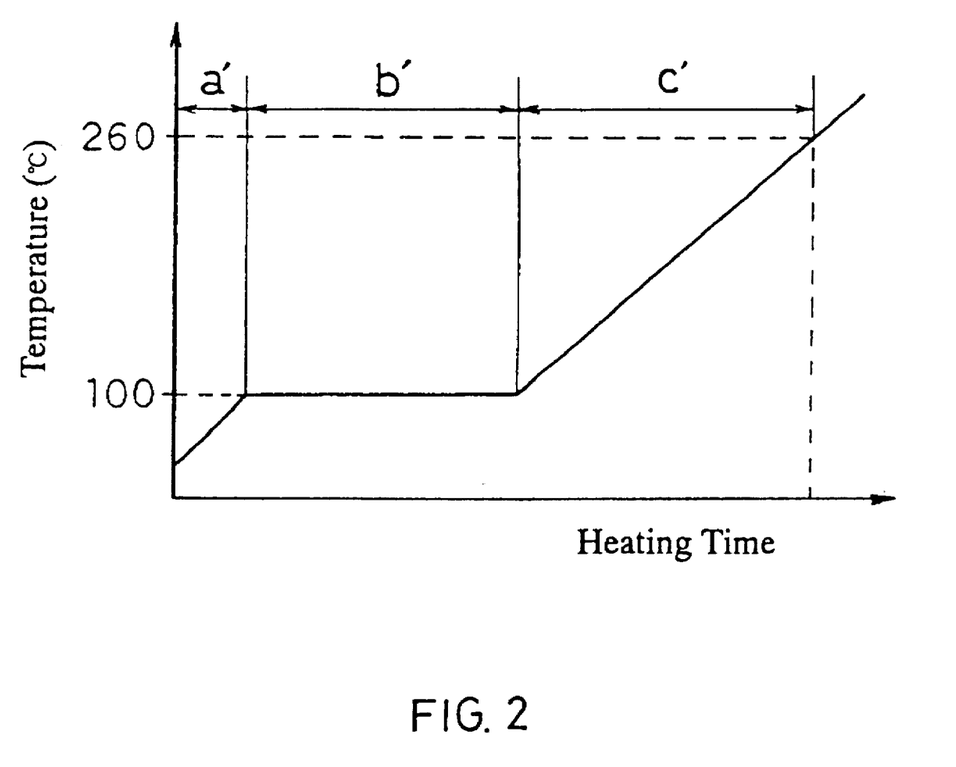
FIG. 2 also is a graph showing the relationship found between the heating time and the temperature of the base plate's face located opposite to the fire resistant composition lining.

Referring to FIG. 2, that graph will be plotted by the secondary heating of a construction element, in accordance with: 'Measurement of Fire Resistance of Non-Combustible Construction Parts' (JIS A-1302). There is shown a relationship between the heating time and the temperature of one face of an external wall, the other face thereof being covered with a fire resistant composition lining adapted for use in wooden houses. Also in this case, there are three periods observed during this test, similarly to the test for the construction elements defined in JIS A-1304. In an initial period (a'), the face is heated to 100° C., and in an intermediate stable period (b') it remains at 100° C. In a final period (c'), the temperature will further rise, so that a longer time necessary for the temperature to rise up to 260° C. will indicate a stronger resistance to fire.

The present invention utilizes ettringite that is a mineral compound in the form of a hydrated salt composed of calcium and aluminum. Ettringite represented with the formula: 3CaO $Al_2O_3$ 3CaY×$H_2O$, in which 'Y' denotes a group selected from $SO_4$, $CO_3$ and $(NO_3)_2$. A number of large-sized fine voids spread throughout the texture and between microcrystallines of ettringite. Thus, 'x' (viz. hydration degree) is so high that a large quantity of hydration water amounting to about 45–55% by weight is retained in the microscopic voids. Natural or manmade ettringite may be used, and the value 'x' thereof may vary depending on their origins or the condition of manufacture. A few or many lots of ettringite having different values 'x' may be blended with each other, if necessary or so desired.

Isolation of the hydration water from the ettringite microcrystallines will begin at about 60° C., to release hydration water as a noncombustible vapor. Ettringite abundant in hydration water has a longer intermediate period (b, b'), thus maintained at 100° C. for a longer time. Ettringite can readily be kneaded with water to give an enamel-like product capable of serving as a binder.

As mentioned above, an inorganic particulate compound may be blended with ettringite to emit at 100°–1000° C. a noncombustible gas such as water vapor or carbon dioxide gas. This effect is derived from the release of hydration water from the inorganic compound or the decomposition thereof. Hydrates and carbonates, that may be used alone or mixed with any proper auxiliary material to provide the inorganic compound, preferably reduce their weight by 10% to produce the noncombustible gas. Such hydrates and carbonates include: aluminum hydroxide for emitting water vapor at 200°–250° C.; calcium carbonate for emitting carbon dioxide gas at about 800° C.; bentonite and sepiolite both emitting water vapor at about 900° C.; sodium bicarbonate emitting water vapor and carbon dioxide gas at about 150° C.; and magnesium hydroxide emitting water vapor at about 400° C. One or any mixture of them may be blended with ettringite, each of them may consist of particles having average diameter of about 1.0 mm or less.

The inorganic particulate compound will continue to release the noncombustible gas, during the final period (c, c'). Consequently, the temperature gradient shown in FIGS. 1 and 2 will be made gentle. Less than 5 parts by weight of the inorganic compound per 100 parts of ettringite will be insufficient to suppress the gradient. More than 500 parts by weight of inorganic compound per 100 parts of ettringite is however too much to assure a desirable content thereof in the composition, so that it becomes difficult for them to be solidified and for the intermediate stable period (b, b') to be lengthened. Thus, 5–500 parts, more preferably 50–400 parts by weight of the inorganic particulate compound have to be blended with 100 parts of ettringite.

Titanium dioxide is extremely stable and will remain undecomposed at high temperatures. It will intercept a radiated heat so as to lower the heat conductivity of the fire resistant lining. All the periods including those (a, a') will be prolonged, when the lining or panel are heated to and then above 100° C. as shown in FIGS. 1 and 2. Titanium dioxide particles may be of any average size, but may preferably be about 1.0 mm or less for a uniform mixing of the ingredients in the fire resistant composition. Less than 0.01 parts by weight of titanium oxide powder for 100 parts of ettringite will be insufficient to lower the heat conductivity, whilst more than 50 parts will not improve this effect any more. Thus, 0.01–50 parts, more preferably 5–20 parts by weight of titanium oxide powder have to be mingled with 100 parts of ettringite.

The composition summarized above may further contain any auxiliary components. A hydraulic cement as one those components will enhance mechanical strength and reduce production cost of the fire resistant composition. Light aggregates such as obsidian pearlite, perlite, burnt vermiculite, and 'shirasu-balloon' will render the composition lighter in weight. Water glass raises the strength, while an alkali-resisting glass fiber, ceramics fiber or the like protects the lining or layer of said composition from cracking, and a water-retaining agent improves the processability of unhardened paste-like composition. A certain agent will preferably be added to avoid the paste-like compositions' high-speed hardening which ettringite may accelerate. Any two or more of these auxiliary agents may be added to the composition.

From a second aspect, a further subject matter of the present invention is a panel comprising the fire-resistant composition as summarized above. In its nature, this panel is designed for attachment to suitable supporting members in a building so as to form an external wall thereof. The panel substantially consists of a base plate and a fire resisting lining, wherein the lining covering the base plate is composed of the fire-resistant composition proposed herein to contain ettringite as the major ingredient.

Figure 3A:
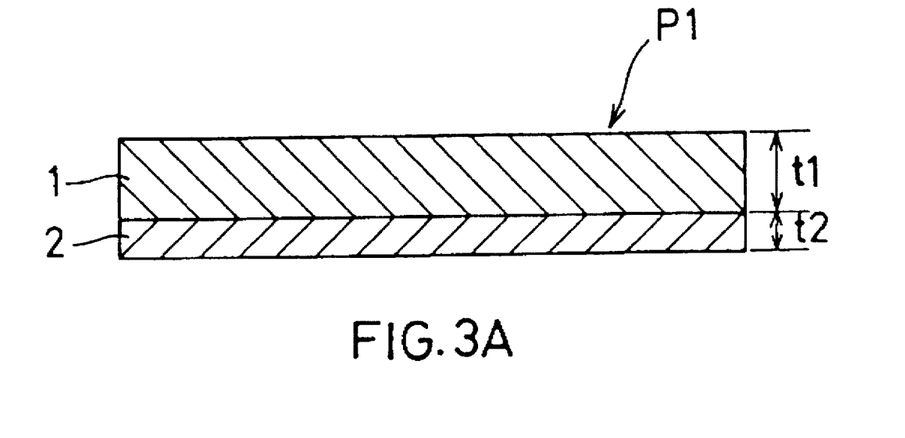
FIG. 3A is a schematic cross section of a panel provided herein for use as the external walls in various buildings, wherein a base plate of the panel consists of a rigid board.
Figure 3B:
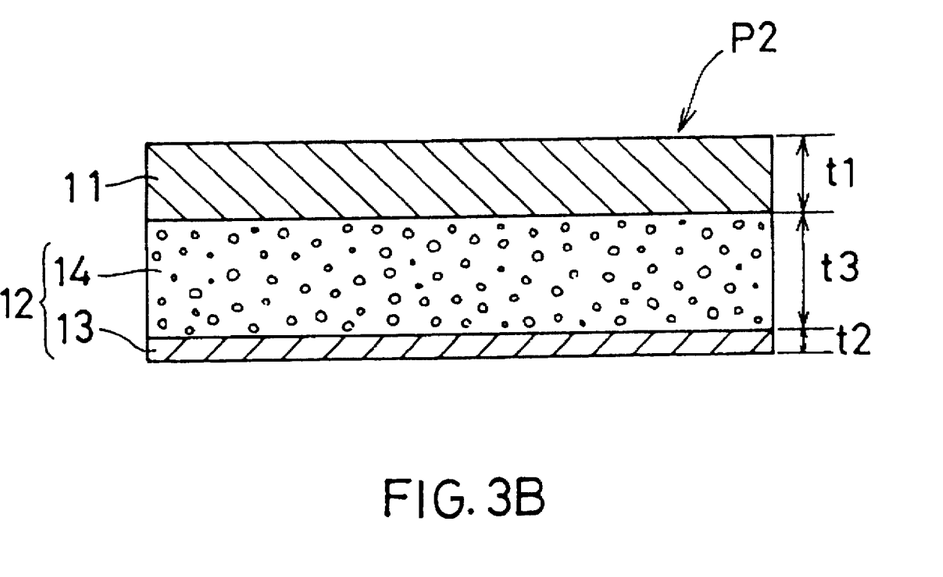
FIG. 3B also is a schematic cross section of a panel provided herein for use as the external walls, wherein a base plate of the panel consists of a rigid board end a fire resistant layer.

It is preferable that the buildings' external walls are lined each with a layer 5–20 mm thick of the fire-resistant composition offered herein from the first aspect. The base plate may be a rigid integral plate as shown in FIG. 3A, or alternatively be a composite board consisting of a rigid base and an organic foam as shown in FIG. 3B. Desirably, the panel has a periphery where the base plate is not covered with the fire-resistant lining so that the panel can be nailed at the periphery to the building body.

The panels P1 and P2 shown in FIGS. 3A and 3B comprise the fire-resisting linings 1 and 11, respectively, whose composition is already described above and therefore shall not be repeated here. The thickness $t_1$ of those linings 1 and 11 is 5–20 mm, preferably 6–15 mm and most preferably about 10 mm. Thinner linings will render poorer the fire resistance, and a linking thinner than 5 mm will scarcely be effective to withstand fire. Thickness $t_1$ greater than 20 mm will merely increase the panel's weight to an undesirable extent.

The base plates 2 and 12 may be of any kind that is rigid enough to stably support the fire-resisting lining 1 and 11, respectively. The base plate 2 may be used alone, or alternatively may be of a composite structure 12 consisting of the rigid base 13 and a heat insulating layer 14 bonded thereto. Preferable examples of the base plate and the rigid base include: various plywood plates; and various wooden fiber boards such as a medium density fiberboard ('MDF') and a particle board ('PB'). The plywood plates are most preferable, since they are of a sufficient rigidity and capable of strongly and permanently holding nails used to attach them supporting bodies of buildings. The thickness $t_2$ of the base plates 2 and 13 is desired to be 3–9 mm, and more preferably 3–7 mm, since a thickness less than 3 mm cannot assure a sufficient rigidity, with a thickness more than 9 mm merely increasing their weight.

The organic foam as heat insulating layer 14 has to be highly insulating, light in weight and not hygroscopic. Preferable examples are polyurethane foam, styrofoam and polystyrene foam, and one of or any mixture of them may be used to form the layer 14 whose thickness $t_3$ is preferably 5–50 mm, and more preferably 10–45 mm.

Figure 5:
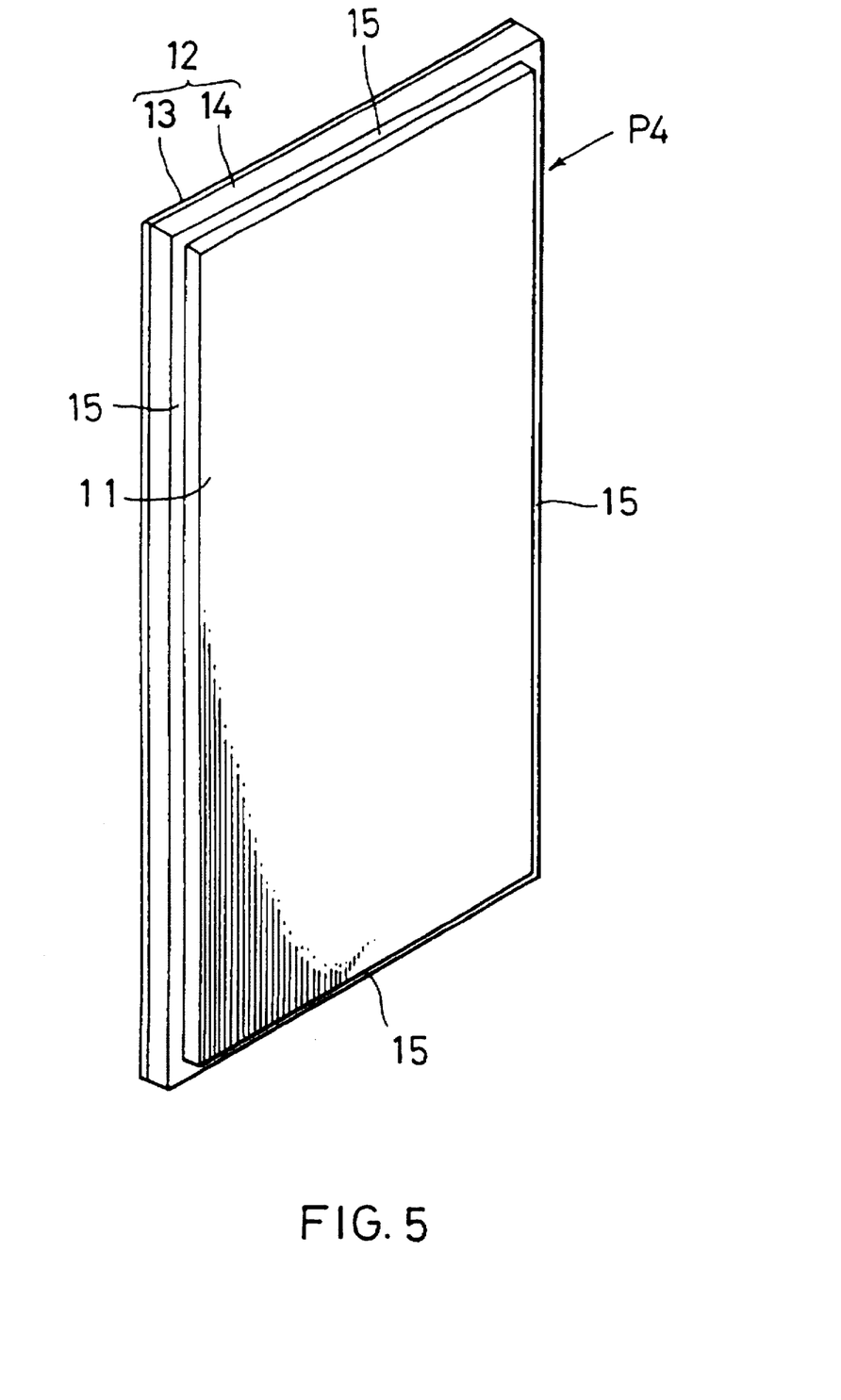
FIG. 5 also is a perspective view of a panel formed in Example 19, for use as the external walls of the buildings.
Figure 8A:
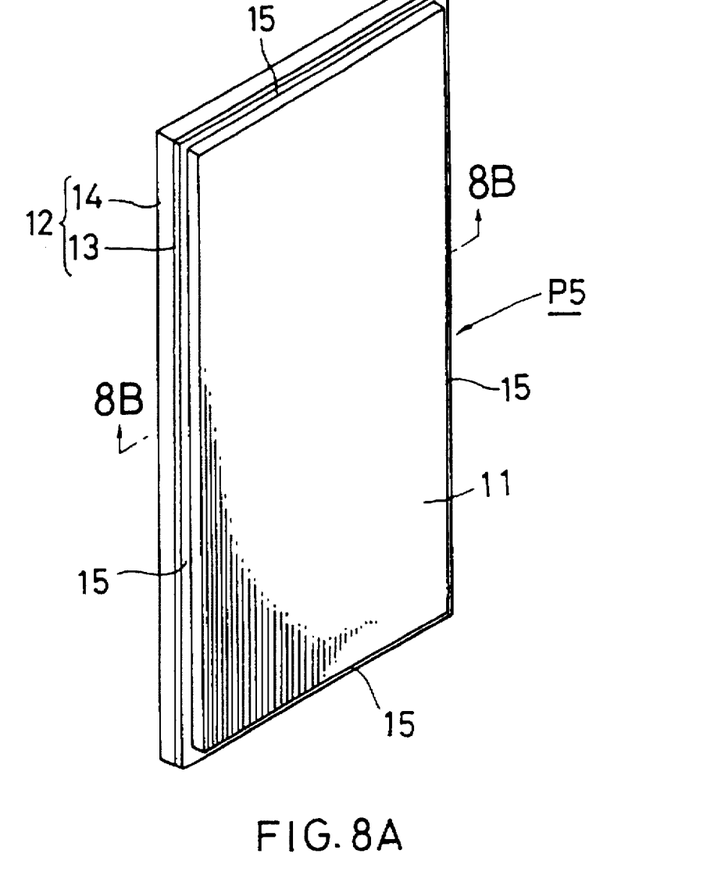
FIG. 8A is a perspective view of a further panel formed in a modification of Example 19.
Figure 8B:
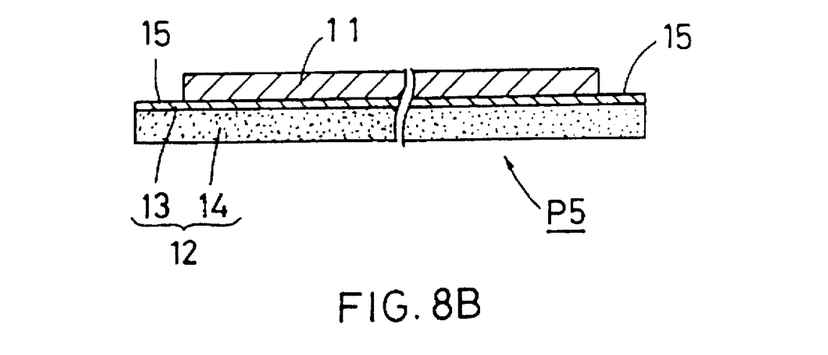
FIG. 8B is a cross section taken along the line 8B—8B in FIG. 8A.

If the base plate 12 of composite structure consists of the rigid base 13 and the heat insulating layer 14, then the fire resisting lining 11 may be bonded either to the insulating layer as shown in FIGS. 3B and 5, or to the rigid base as shown in FIGS. 8A and 8B.

Desirably, the panel P3 or P4 has a periphery 5 or 15 where the base plate 2 or 12 is not covered with the fire resisting lining 1 or 11 so that the panel can be nailed at the periphery to the building body. This feature is advantageous in constructing the external wall according to the third aspect of the present invention, as will be detailed below. The width of said periphery 5 or 15 may preferably be about 5 mm for each side of the base plate 2 or 12.

It is desirable to make waterproof the external panels P1, P2, P3 and P4. For this purpose, a waterproof agent such as an acrylic, silicone or asphalt emulsion may be applied to at least one surface of base plate 2, rigid base 13, insulating layer 14, or fire resisting lining 1 or 11. Alternatively, a waterproof sheet or film may be bonded to at least one of them 2, 13, 14, 1 or 11, or a waterproof agent may previously be blended with the material of fire resisting lining 1 or 11. Preferable waterproof agents are a synthetic rubber latex, the asphalt emulsion, a polyvinyl acetate emulsion and a re-emulsified synthetic resin powder.

External buildings wall may be constructed or finished in the following manner using any panel P1 or P2 summarized above. The other panels P3 and P4 each having the periphery 5 or 15 not covered with the fire resisting lining 1 or 11 are not involved here but shall be detailed later in connection with a third aspect of the present invention. At first, the panels P1 or P2 will be placed on and fixed to the whole surface of a building body, such that their fire resisting linings 1 or 11 are exposed to the outside and their side edges abut against each other. The fixing of those panels may be done using usual nails, threaded nails and/or an adhesive. Subsequently, seams of and between the adjacent panels will be mended by applying thereto a waterproof agent or bonding thereto a waterproof sheet, film or tape. Finally, the whole outer surface of those external panels will be finished with a coating such as paint, or with sizing pieces such as tiles.

From the third aspect of the invention, the panels (P3, P4) formed from the second aspect of the invention and each having the periphery not covered with the fire resisting lining (which is composed mainly of ettringite) are involved to construct external walls of buildings. Side edges of fire resisting linings belonging to the adjacent panels, which are fixed to the building body and included in a plane, will face one another to define between them groove-shaped cavities. These cavities shall be filled with a certain caulking compound. This compound may preferably of substantially the same composition as the fire resisting lining.

FIGS. 6A to 7B show stud walls that are external walls formed in wooden houses by using the panels P3 or P4 in the following manner.

At first, one panel P3 or P4 will be disposed along lath bars 31 on the building body 3. Periphery 5 or 15 of base plate 2 or 12 will then be nailed 4 at proper intervals to the lath bars 31. The succeeding panels will likewise be attached thereto, such that their base plates 2 or 12 have sides in close contact with those of the other panels P3 or P4 already secured in place.

Groove-shaped cavities 6 or 16 will appear between the facing sides of fire resisting linings 1 and 1, or 11 and 11, of the panels P3 or P4 that have been attached to the outer face of building body 3. Surfaces of each groove-shaped cavity 6 or 16 will preferably be water-proofed by applying a waterproof paint or the like or by bonding a waterproof sheet or the like, likewise as in the case of each panel. Alternatively, the caulking material may be rendered waterproof, similarly to the fire resisting lining 1 or 11, so as to dispense with the intricate work.

Next, the groove-shaped cavities 6 or 16 shall be filled with caulking material 7 or 17, which desirably comprises ettringite as its main ingredient. The caulking material may be of the same composition as the linings 1 or 11, so that the fire resistance is also afforded to the boundaries between the panels P3 or P4. Such a uniform internal structure of such an external wall is advantageous in that a finish coat 8 can be painted evenly to provide a beautiful outer face free from color unevenness. However, the caulking material 7 or 17 may be of a different composition from that of lining 1 or 11. In this case, a waterproof agent layer or a thick primer layer may be formed on the caulked face, before finished with a relatively thin outermost coat, so as to ensure the evenly painted wall surface.

The coat 8 formed in the describe manner to provide the finished surface to the external wall may be replaced with a number of tiles or the like, if so wanted.

The panels P3 or P4 as external building wall may not necessarily be nailed to the body 3, but be fastened thereto by means of threaded nails or bolts and/or an adhesive. In a case wherein the panel P5 comprises the rigid base 13 covered with the fire resisting lining 11, this base shall be disposed outside the heat insulating layer 14 (see FIGS. 8A and 8B).

It will now be apparent that the fire resistant composition provided herein from the first aspect of the invention characteristically comprises ettringite, whose hydration water starts to be released at about 60° C. to emit water vapor. Since ettringite continues to absorb heat due to evaporation of hydration water, the lining or panel formed of this composition will be kept at 100° C. for a time in the intermediate period (b, b'). This time is remarkably longer than that of the prior art composition disclosed in the Patent Publication 2-28555, because ettringite is not only richer in hydration water (45–55% by weight, as compared with 25–35% in aluminum hydroxide) but also starts at a lower temperature to release the hydration water.

The inorganic particulate compounds used in combination with ettringite will also release hydration water and/or decompose to absorb heat at raised temperatures from 100° to 1000° C. Thus, the temperature gradient in the final period (c, c') (see FIGS. 1 and 2) is made smaller. Ettringite advantageously cooperates with the inorganic compounds in this manner to further enhance the fire resistance of the composition, panels and external building walls.

The non-combustible gases from ettringite and the inorganic compounds do not only absorb heat when they are produced, but also form a non-combustible gas layer around the panel. This gas layer will decelerate heat conduction to further enhance the resistance to fire.

Titanium oxide powder will reflect the heat radiation incident upon the panel, to thereby lower heat conduction therethrough. Thus, use of titanium oxide powder together with ettringite, possibly in addition to the inorganic compounds brings about an 'interactively improved effect' of fire resistance.

In summary, the fire resistant composition provided herein from the first aspect can form a fire resisting lining reduced in thickness and improved in fire resistance. The slim lining decreases the weight of structural elements and enables rapid construction and curing thereof. The auxiliary ingredients added to ettringite raise strength, reduce weight of said elements and protect them from cracking, thus rendering easier and inexpensive construction works.

The panel provided from the second aspect is excellent in fire resistance, due to its fire resisting lining formed of the composition provided from the first aspect. The base plate as well as fire resisting lining can be made thinner, without undesirably impairing the panel's fire resistance. Inorganic compounds and titanium dioxide blended with ettringite, as well as the lining's regulated thickness, further enhance fire resistance. This panel rendering thinner, compacted and lighter the external wall need not be plastered with any fire resisting mortar or the like, thus realizing an easier, smooth, rapid and inexpensive construction, wherein no skilled work is required to handle any wet material.

If the base plate comprises the rigid base and the organic heat-insulating layer, then panel will not only be fire resistant but also intercept heat conduction. The organic foam is not hygroscopic so that the panel is protected from crashing caused by expansion of frozen water. Thus, this highly heat-insulating panel can be used even in cold districts. A polyurethane foam, styrofoam or polystyrol foam are particularly preferred, because they can readily be regulated in thickness to realize a desired heat insulation.

If the panel has its periphery or fringe not covered with the fire resisting lining, it is easy to secure the panel to a building body by nailing thereto said periphery or fringe.

The structure of external walls provided from the third aspect will be constructed using the panels offered from the second aspect has therefore a principal feature similar to those described above.

Groove-shaped cavities each appearing between the adjacent panels may be filled with the caulking agent of the same composition as the panels' lining, whereby fire resistance is ensured over the whole external wall, and such a uniform wall can be finished evenly and beautifully with a finish coat free from any color unevenness.

DETAILED DESCRIPTION OF THE PREFERRED EMBODIMENTS

Preferable examples of the fire resistant composition, the panel usable as external walls of buildings and the structure of said walls, all provided by the present invention, will now be described in detail.

[FIRE RESISTANT COMPOSITION]

EXAMPLES 1-17

Used as the main ingredient of fire resistant composition was: ettringite having 46% by weight of hydration water. Inorganic compounds used together with ettringite were: aluminum hydroxide having an average particle diameter of 0.1 mm; calcium carbonate also having av. diameter of 0.1 mm; bentonite having av. diameter of 0.2 mm; sepiolite having av. diameter of 1 mm; sodium bicarbonate having av. diameter of 0.1 mm; magnesium hydroxide also having av. diameter of 0.1 mm; and titanium dioxide having av. diameter of 1 µm. Voluntary ingredients were: white cement; pearlite having av. diameter of 2.5 mm; and alkali-resisting glass.

These ingredients were used in various combinations to prepare compositions as EXAMPLES 1-17 and REFERENCES 1-5 as shown in Table 1, and their fire resistance was tested as follows.

25 kilograms of each composition was kneaded with 13 liters of water to form a paste, which subsequently was applied to both sides of an iron plate that was 100 mm wide, 100 mm long and 1.5 mm thick. The composition 'cake' thus formed on the iron plate to be 15 mm thick was then cured to harden at 25° C. and humidity of 70% RH for 28 days, so as to provide test pieces.

Thermocouple electrodes were secured to the iron plate and the cured composition cake (viz. fire resisting lining) of each test piece, and the latter was placed in an oven. Subsequently, temperature of this oven was raised such that the surface temperature of said test piece had a temperature prescribed in the JIS A-1304 while measuring temperature of the iron plate. The duration of time until the iron plate had reached 350° C. was defined as 'fire resisting hours', as seen in Table 1.

TABLE 1

| - Ingredients - | Examples |  |  |  |  |  |  |  |  |  |  |
|---|---|---|---|---|---|---|---|---|---|---|---|
|  | 1 | 2 | 3 | 4 | 5 | 6 | 7 | 8 | 9 | 10 | 11 |
| ettringite | 100 | 100 | 100 | 100 | 100 | 100 | 100 | 100 | 100 | 100 | 100 |
| Al(OH)$_3$ | — | 100 | 200 | 300 | — | — | — | — | — | 150 | 200 |
| CaCO$_3$ | — | — | — | — | 200 | — | — | — | — | 150 | — |
| bentonite | — | — | — | — | — | 200 | — | — | — | — | 100 |
| sepiolite | — | — | — | — | — | — | 200 | — | — | — | — |
| NaHCO$_3$ | — | — | — | — | — | — | — | 200 | — | — | — |
| Mg(OH)$_2$ | — | — | — | — | — | — | — | — | 200 | — | — |
| TiO$_2$ | — | — | — | — | — | — | — | — | — | — | — |
| white cement | — | — | — | — | — | — | — | — | — | — | — |
| pearlite | — | — | — | — | — | — | — | — | — | — | — |
| alkali-resisting glass fiber | 5 | 5 | 5 | 5 | 5 | 5 | 5 | 5 | 5 | 5 | 5 |
| Fire-resisting hours | 61 | 69 | 68 | 67 | 65 | 64 | 64 | 66 | 65 | 70 | 71 |

| - Ingredients - | Examples |  |  |  |  |  | References |  |  |  |  |
|---|---|---|---|---|---|---|---|---|---|---|---|
|  | 12 | 13 | 14 | 15 | 16 | 17 | R.1 | R.2 | R.3 | R.4 | R.5 |
| ettringite | 100 | 100 | 100 | 100 | 100 | 100 | — | — | — | — | — |
| Al(OH)$_3$ | — | — | 200 | 200 | 200 | 200 | — | 200 | 150 | 200 | — |
| CaCO$_3$ | — | — | — | 200 | — | — | — | — | 150 | — | — |
| bentonite | — | — | — | — | — | — | — | — | — | — | — |
| sepiolite | — | — | — | — | — | — | — | — | — | — | — |
| NaHCO$_3$ | — | — | — | — | — | — | — | — | — | — | — |
| Mg(OH)$_2$ | — | — | — | — | — | — | — | — | — | — | — |
| TiO$_2$ | 10 | 20 | 20 | 30 | 30 | 40 | — | — | — | — | 20 |
| white cement | — | — | — | — | 50 | 50 | 100 | 100 | 100 | 100 | 100 |
| pearlite | — | — | — | — | — | 20 | — | — | — | 20 | — |
| alkali-resisting glass fiber | 5 | 5 | 5 | 5 | 5 | 5 | 5 | 5 | 5 | 5 | 5 |
| Fire-resisting hours | 70 | 72 | 80 | 82 | 79 | 80 | 31 | 45 | 46 | 50 | 35 |

Notes: Content is given in the term of 'parts by weight'.

As will be seen in Table 1, all the EXAMPLES forming the lining proved excellent in fire resistance. Ettringite had better be used together with the inorganic compounds and/or titanium dioxide powder, rather than used alone.

In contrast, REFERENCES 1-5 each comprising white cement in place of ettringite showed shorter 'fire-resisting hours', thus proving inferior to EXAMPLES with respect to fire resistance.

[PANELS AS EXTERNAL WALL OF BUILDINGS]

EXAMPLE 18

Figure 4:
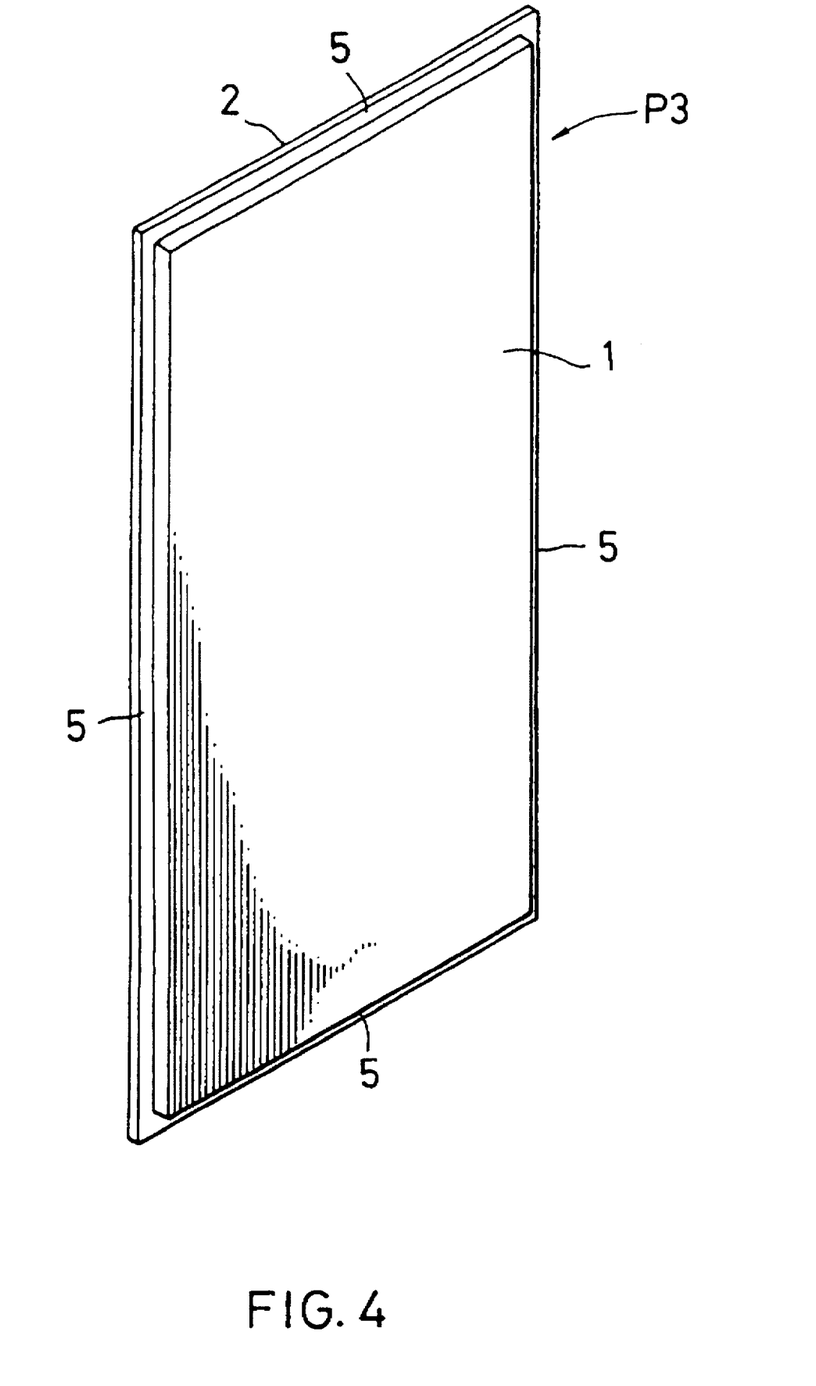
FIG. 4 is a perspective view of a panel formed in Example 18, for use as the external walls of the buildings.

FIG. 4 is a perspective view of a panel P3 for use as the external wall in buildings. This panel comprised a plywood rigid base plate 2 which was 900 mm wide, 1800 mm long and 5.5 mm thick. A fire resisting lining 1, which was 10 mm thick and of the composition according to EXAMPLE 14, was bonded to the base plate. A periphery or fringe 5 of the base plate 2 was 5 mm wide and not covered with the lining 1, so as to be nailed to a building body. A waterproofing silicone emulsion had been applied to the base plate 2, before the lining 1 was formed thereon.

The periphery 5 is exaggerated in FIG. 4, for an easier understanding of the structure.

EXAMPLE 19

FIG. 5 is a perspective view of a further panel P4 also for use as the external wall in buildings. A base plate 12 of this panel consisted of a rigid plywood base 13 and a heat insulating layer 14, both of the same dimension as that in EXAMPLE 18. A fire resisting lining 11, which was 10 mm thick and of the composition according to EXAMPLE 14, was adjoined to the heat insulating layer 14. A periphery or fringe 15 of the base plate 12 was 5 mm wide and not covered with the lining 11. A waterproofing polyvinyl acetate emulsion had been blended with the lining 11, before the latter was applied to the base plate.

A still further panel P5 shown in FIGS. 8A and 8B is a modification of that shown in FIG. 5, wherein the lining 11 was applied to the rigid base 13 of base plate 12.

The periphery 15 is also exaggerated in FIGS. 5, 8A and 8B, for an easier understanding of the structure.

[STRUCTURE OF EXTERNAL WALL OF BUILDINGS]

EXAMPLE 20

A stud wall for a wooden house was formed using the panels P3 provided in EXAMPLE 18.

Figure 6A:
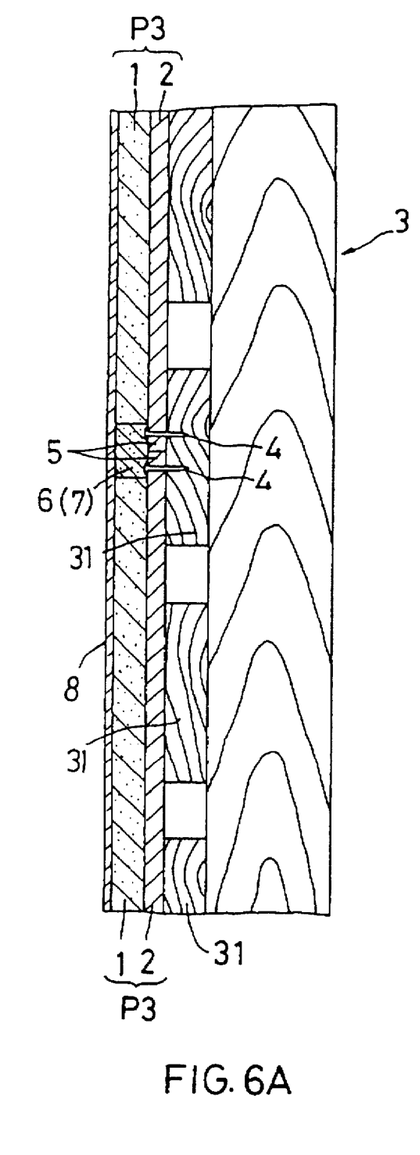
FIG. 6A is a vertical cross section of an external wall structure provided in Example 20.
Figure 6B:
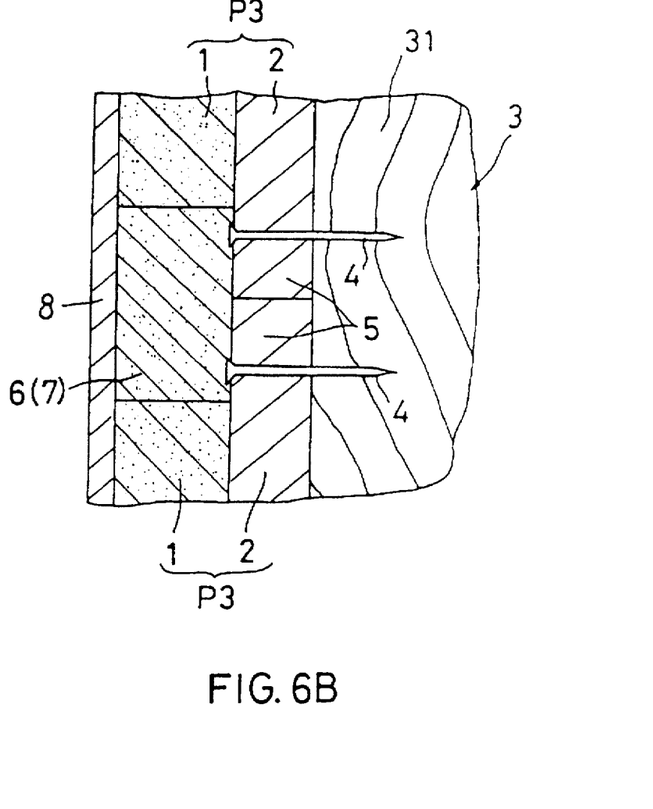
FIG. 6B is an enlarged cross section of the structure's region where a groove-shaped cavity extends through said structure shown in FIG. 6A.

As seen in FIGS. 6A and 6B, the panels P3 were disposed on and along lath bars 31 attached to a building body 3. The periphery 5 of the base plate 2 of one panel P3 was fixed to the lath bars 31 by means of nails 4. The other panels were likewise fixed to said bars, in such a manner that their side edges were in close contact with those of the one panel which will have been secured to the lath bars.

Then, a waterproofing treatment was carried out for the boundaries between the panels P3 covering the whole outer face of the body 3, by applying thereto a silicone emulsion.

Next, groove-shaped cavities 6 appearing between the fire resisting linings' sides facing one another were filled with a caulking material 7 of the same composition as the fire resisting lining 1.

Finally, a finish coat 8 was applied to the whole surface of panels P3 so as to complete the forming of the stud wall.

EXAMPLE 21

Another stud wall for the wooden house was formed using the panels P4 provided in EXAMPLE 19.

Figure 7A:
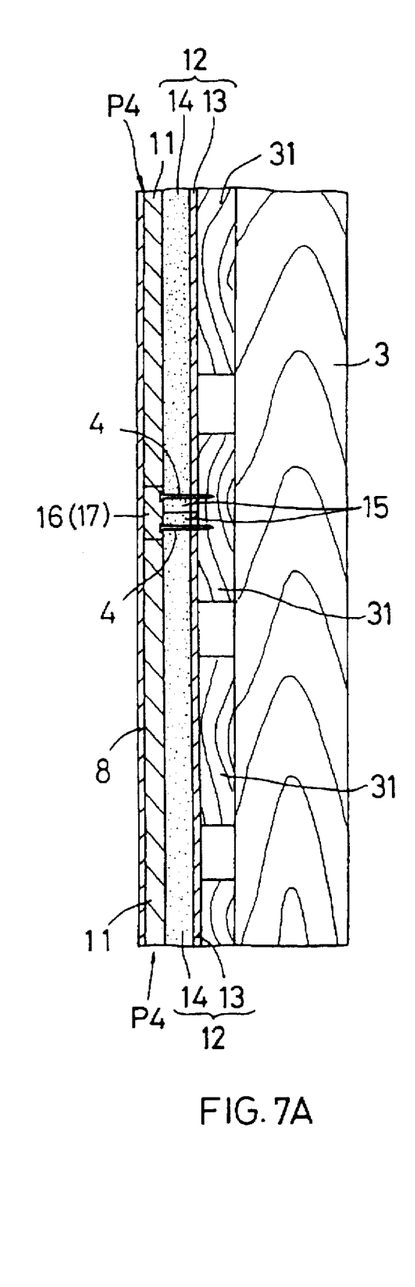
FIG. 7A also is a vertical cross section of an external wall structure provided in Example 21.
Figure 7B:
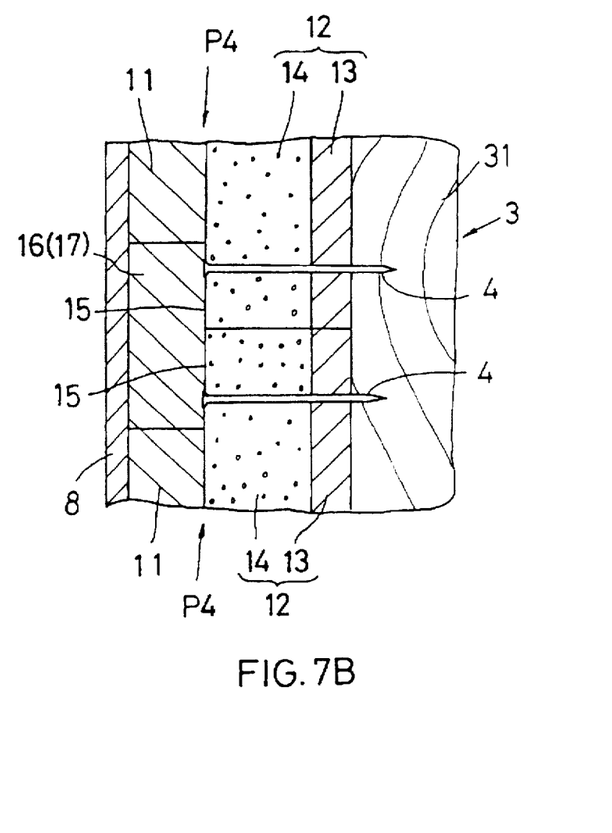
FIG. 7B is an enlarged cross section of the structure's region where a groove-shaped cavity likewise extends through said structure shown in FIG. 7A.

As seen in FIGS. 7A and 7B, the panels P4 were secured to the building body 3, so as to cover the whole outer face thereof, similarly to EXAMPLE 20.

Next, groove-shaped cavities 16 appearing between the fire resisting linings' sides facing one another were filled with a caulking material 7 substantially of the same composition as the lining 11 but containing a water-proof agent.

Finally, a finish coat 8 was applied to the whole surface of panels P4 similarly to EXAMPLE 20.

[TEST OF FIRE RESISTANCE OF PANELS FOR FORMING EXTERNAL WALL OF BUILDINGS]

Next, an example of fire-resistance of panels for forming external wall of buildings provided by the present invention will be described in detail.

Rigid plywood plates each being 300 mm wide, 300 mm long and 5.5 mm thick were prepared as the base plates, together with polyurethane foam plates each being 300 mm wide, 300 mm long and 25 mm thick. Some of the plywood plates were bonded to the latter to provide the other base plates of a composite type.

On the other hand, the heat resistant compositions of 22 (twenty-two) types were prepared, corresponding to EXAMPLES 1–17 and REFERENCES 1–5. 25 kilograms of each composition was kneaded with 13 liters of water to provide pastes for forming the fire resisting linings.

These 22 lining pastes were then applied to one side of each simple base plate, or to the heat insulating layer on each composite base plate, so as to form paste cakes each 8 mm, 12 mm or 16 mm thick. These paste cakes were subsequently cured to harden at 25° C. and 70% RH for 28 days. 132 test pieces of external wall panel were prepared in this manner.

A thermocouple was placed at a boundary between the base plate and the fire resisting lining, with the later being heated for 30 minutes according to the secondary heating condition as prescribed in JIS A-1302 'Measurement of Fire Resistance of Non-Combustible Construction Part'. The maximum temperature appearing at each boundary was detected.

Tables 2A, 2B and 2C (respectively for the thickness of 8 mm, 12 mm and 16 mm as mentioned above) show a result of measurement carried out in accordance with JIS A-1302. Since the same level of fire resistance (viz. the maximum temperature at the boundary) was detected whether the base plate was of the simple or composite structure, each Table 2A etc. recite the result inclusive of the two types of base plates.

As seen in Tables 2A–2C, all the panels provided as EXAMPLES 1–17 marked the maximum temperature lower than 260° C., whether the thickness was 8 mm, 12 mm or 16 mm. Thus, they met the requirement in A-1302 and proved excellent in fire resistance. Ettringite had better be used together with the inorganic compounds and/or titanium dioxide powder, rather than used alone.

TABLE 2A (Fire Resisting Lining 8 mm Thick)

| | Maximum temperature (°C.) | Rating by JIS A-1302, secondary heating |
|---|---|---|
| EXAMPLES | | |
| 1 | 153 | * approved * |
| 2 | 142 | " |
| 3 | 140 | " |
| 4 | 139 | " |
| 5 | 145 | " |
| 6 | 144 | " |
| 7 | 145 | " |
| 8 | 142 | " |
| 9 | 143 | " |
| 10 | 120 | " |
| 11 | 121 | " |
| 12 | 120 | " |
| 13 | 116 | " |
| 14 | 100 | " |
| 15 | 100 | " |
| 16 | 100 | " |
| 17 | 100 | " |
| REFERENCES | | |
| 1 | 389 | * failed * |
| 2 | 373 | " |
| 3 | 391 | " |

TABLE 2A-continued (Fire Resisting Lining 8 mm Thick)

| | Maximum temperature (°C.) | Rating by JIS A-1302, secondary heating |
|---|---|---|
| 4 | 375 | " |
| 5 | 370 | " |

TABLE 2B (Fire Resisting Lining 12 mm Thick)

| | Maximum temperature (°C.) | Rating by JIS A-1302, secondary heating |
|---|---|---|
| EXAMPLES | | |
| 1 | 132 | * approved * |
| 2 | 123 | " |
| 3 | 120 | " |
| 4 | 118 | " |
| 5 | 126 | " |
| 6 | 125 | " |
| 7 | 125 | " |
| 8 | 121 | " |
| 9 | 123 | " |
| 10 | 100 | " |
| 11 | 100 | " |
| 12 | 100 | " |
| 13 | 100 | " |
| 14 | 100 | " |
| 15 | 100 | " |
| 16 | 100 | " |
| 17 | 100 | " |
| REFERENCES | | |
| 1 | 378 | * failed * |
| 2 | 362 | " |
| 3 | 379 | " |
| 4 | 364 | " |
| 5 | 360 | " |

TABLE 2C (Fire Resisting Lining 16 mm Thick)

| | Maximum temperature (°C.) | Rating by JIS A-1302, secondary heating |
|---|---|---|
| EXAMPLES | | |
| 1 | 110 | * approved * |
| 2 | 100 | " |
| 3 | 100 | " |
| 4 | 100 | " |
| 5 | 105 | " |
| 6 | 105 | " |
| 7 | 105 | " |
| 8 | 100 | " |
| 9 | 100 | " |
| 10 | 100 | " |
| 11 | 100 | " |
| 12 | 100 | " |
| 13 | 100 | " |
| 14 | 100 | " |
| 15 | 100 | " |
| 16 | 100 | " |
| 17 | 100 | " |
| REFERENCES | | |
| 1 | 331 | * failed * |
| 2 | 313 | " |
| 3 | 332 | " |
| 4 | 315 | " |
| 5 | 310 | " |

In contrast, REFERENCES 1–5 each comprising white cement in place of ettringite were heated to temperatures higher than 260° C., thus failing to meet the requirement and proving inferior to EXAMPLES with respect to fire resistance.

What is claimed is:

1. A panel attachable to a building body so as to form an external wall thereof, the panel comprising:

a base plate;

a fire resisting lining formed thereon, wherein the lining is composed of a fire resistant composition consisting essentially of ettringite, inorganic particulate compounds and titanium oxide, wherein said composition contains 5–500 parts by weight of inorganic particulate compounds and 0.01–50 parts by weight of titanium oxide powder, both said compounds and powder blended with 100 parts by weight of ettringite; with the proviso that said inorganic particulate compounds release noncombustible gases at 100°–1000° C., and are at least one of the group consisting of calcium carbonate, bentonite, sepiolite, sodium bicarbonate and magnesium hydroxide.

2. A panel as defined in claim 1, wherein the fire resisting lining is 5–20 mm thick.

3. A panel as defined in claim 1, wherein the base plate is a rigid base.

4. A panel as defined in claim 1, wherein the base plate is composed of a rigid base and an organic foam formed thereon as a heat insulating layer.

5. A panel as defined in claim 4, wherein the heat insulating layer is composed of at least one organic foam selected from a group consisting of polyurethane foam, styrofoam and polystyrol foam.

6. A panel as defined in claim 4, wherein the heat insulating layer is 5–50 mm thick.

7. A panel as defined in claim 1, wherein the base plate has a periphery not covered with the fire resisting lining so as to be nailed to the building body.

8. A structure of an external wall of buildings, the structure comprising:

a plurality of panels attached to a building body to form a plane and having their sides adjoined one to another;

each panel comprising a base plate and a fire resisting lining formed thereon;

the base plate having a periphery not covered with the lining;

the adjacent panels having their fire resisting linings facing one another to define therebetween a groove-shaped cavity; and the cavity being filled with a caulking material.

9. A structure as defined in claim 8, wherein the caulking material is substantially of the same composition as the fire resisting linings.

* * * * *